United States Patent [19]

Hanson et al.

[11] Patent Number: 5,557,440
[45] Date of Patent: Sep. 17, 1996

[54] NOISE-INSENSITIVE OPTOENCODING TECHNIQUES WITH COMPENSATION FOR DEVICE VARIATIONS

[75] Inventors: Mark T. Hanson, Lynnwood; Glade B. Bacon, Everett, both of Wash.

[73] Assignee: Microsoft Corporation, Redmond, Wash.

[21] Appl. No.: 177,462

[22] Filed: Jan. 5, 1994

[51] Int. Cl.$^6$ .............................. H03K 17/78; G09G 5/08
[52] U.S. Cl. ................ 359/161; 250/214 R; 250/231.13; 345/163; 345/165
[58] Field of Search ..................................... 395/275, 425, 395/550; 359/142, 143, 145, 161; 372/29; 345/162, 163, 164, 165, 167; 358/473; 250/231.13, 214 R

[56] References Cited

U.S. PATENT DOCUMENTS

| | | | |
|---|---|---|---|
| 4,920,260 | 4/1990 | Victor et al. | 340/710 |
| 5,027,109 | 6/1991 | Donovan et al. | 340/706 |
| 5,287,120 | 2/1994 | Okada et al. | 345/163 |
| 5,288,993 | 2/1994 | Bidiville et al. | 250/231.13 |
| 5,384,457 | 1/1995 | Sommer | 250/231.13 |
| 5,384,460 | 1/1995 | Tseng | 345/165 |

FOREIGN PATENT DOCUMENTS 0310230  4/1989  European Pat. Off. ............ 250/214 R

OTHER PUBLICATIONS

Teschler, "Interfacing Mice to Computers," *Machinery Design*, Jan 12, 1984, pp. 84–91.

*Primary Examiner*—Leo Boudreau
*Assistant Examiner*—Bhavesh Mehta
*Attorney, Agent, or Firm*—Seed and Berry LLP

[57] ABSTRACT

A method of detecting quadrature signals in a computer input device allows a microprocessor in the input device to perform comparator functions, thus eliminating the need for external comparator circuitry. At least one light-emitting element in the input device emits light pulses, and these light pulses are selectively received by a light-detecting element. A notched encoder wheel separates the light-emitting element from the light-detecting element, allowing various amounts of light to be received by the light-detecting element depending on whether a notch separates the two elements. The microprocessor loads a sample of the output from the light-detecting element: a first sample taken at a selected time value and a second sample taken at twice the selected time value. The second sample is used for quadrature calculations used in determining cursor movement on a video display device. The first sample is retrieved by the microprocessor and determined if it is a digital "1" signal. If it is, then the selected time value is decremented by one sampling period.

31 Claims, 7 Drawing Sheets

| SAMPLE # | XA | XB | YA | YB |
|---|---|---|---|---|
| 1 | 0 | 0 | 0 | 0 |
| 2 | 0 | 1 | 0 | 0 |
| 3 | 0 | 1 | 0 | 0 |
| 4 | 1 | 1 | 1 | 1 |
| 5 | 1 | 1 | 1 | 1 |
| 6 | 1 | 1 | 1 | 1 |

NOISE-INSENSITIVE OPTOENCODING TECHNIQUES WITH COMPENSATION FOR DEVICE VARIATIONS

TECHNICAL FIELD

The present invention relates to optoelectronic devices that provide input signals to microprocessor circuits, particularly optoelectronic devices used in computer input devices such as mice or trackballs.

BACKGROUND OF THE INVENTION

Many computer input devices, particularly mice and trackballs, use pairs of optoelectronic devices to generate electrical signals indicative of the mice and trackball movement. These electrical signals are used to control cursor movements on a video display of a computer. Mice and trackballs typically include a housing enclosing the optoelectronic devices and supporting a rotatable ball. The ball is in contact with two coupling shafts extending perpendicularly to each other. As the ball rotates, it rotates either or both of the shafts depending upon the direction of rotation of the ball. A notched encoder wheel is mounted on each shaft between the paired optoelectronic devices, typically a light-emitting diode ("LED") and a photodetector. The encoder wheel allows varying amounts of light from the LED to reach the photodetector depending upon the position of a notch between the LED and the photodetector. As the ball is rotated by a user, the corresponding rotations of the encoder wheels modulate the light received by the photodetector from the LED, thereby providing respective signals indicative of movement of the mouse or trackball in two orthogonal directions.

As an encoder wheel rotates, the adjacent photodetector outputs an analog signal consisting of a series of pulses. This series of pulses is input to a microprocessor within the mouse. These pulses are used to determine the magnitude and direction of mouse travel using quadrature calculation or other known techniques.

Most microprocessors are generally able to sense only digital input signals, i.e., a "0" or a "1" input signal. When an input signal exceeds a threshold value particular to the microprocessor, the microprocessor interprets the incoming signal as a digital "1" input signal. Generally, this threshold value cannot be adjusted in the microprocessor, and because of variations in manufacturing or other components, the threshold value may be too high or low for a particular application. Therefore, to compensate, prior systems have used comparator circuits exhibiting hysteresis positioned between the output terminal of the photodetector and the input terminal of the microprocessor to convert the analog signal from the photodetector to an incoming digital signal. The hysteresis of the comparator circuit can be adjusted to provide a "1" input to the microprocessor when the output signal from the photodetector exceeds an adjusted threshold value.

Most mice or trackballs use at least two optoelectronic pairs, thus generally requiring at least two, typically four, comparators. These external comparator circuits are often costly. Additionally, the optoelectronic pairs vary in their output characteristics, and the threshold values of microprocessors vary. Therefore, the comparators in each mouse must be tuned to the particular optoelectronic pairs and microprocessor used in the mouse. This tuning is also costly.

One known method of avoiding the above variations in optoelectronic pairs and microprocessor threshold voltages eliminates the comparators and uses a method performed by the microprocessor to act as a comparator. The microprocessor pulses the LED to conserve power. During each pulse, the method samples the output from the photodetector. A sample taken at a particular time is used for quadrature calculation. The time at which this particular sample is taken is adjusted to provide signals for accurate quadrature calculation. The method continuously measures the time the photodetector takes to make the transition from a digital "0" to a "1" input signal, and thereby the response of the optoelectronic pair can be approximated.

Under the method, a time value is established which represents the maximum amount of time required for a photodetector output signal to reach the microprocessor's threshold value after the encoder wheel permits light from the LED to reach the photodetector. The method then counts up to a predetermined fraction of this worst case time value and determines whether a digital "1" value is interpreted by the microprocessor. If a digital "1" is not interpreted, the counter continues to count and samples are taken of the photodetector's output signal until a point in time when a digital "1" signal is detected. At this point in time, the time value is reset to the current time value on the counter. If the counter counts up the maximum time value without interpreting a digital "1" signal, the time value remains at its established maximum time value. In either case, the microprocessor thereafter counts for another period of time equal to the current time value (either the reset or maximum value) and then samples the photodetector's output for quadrature calculation.

This method suffers from several deficiencies. For example, this method is particularly sensitive to noise. If the method encounters an initial noise spike while resetting the time value, the method may thereafter provide a predominance of digital "0" samples of the photodetector output for quadrature calculation. Additionally, the method requires two loops during the method, i.e., a counter loop where the counter is incremented by one time interval, and a comparison loop where the current sample is compared to a "1" signal. As a result, a faster, and thus more expensive, microprocessor is required to perform this method.

SUMMARY OF THE INVENTION

The present invention provides a method of producing an equal series of digital "0" and "1" signals from a series of analog pulse signals produced from a photodetector receiving a series of light pulses from a light-emitting element. The present invention is useful for providing optoelectronic device inputs to a microprocessor without the need of a comparator or hysteresis-type circuit. The present invention is particularly useful in providing signals for quadrature calculation in a computer input device which allows a microprocessor in the input device to perform comparator functions, thus eliminating the need for external comparator circuitry. In the input device, an LED is pulsed and each pulse that passes through a notched encoder wheel is received by a photodetector. During each pulse of the LED, several samples of the voltage signal output from the photodetector are taken by the microprocessor at selected time intervals. The predetermined intervals are in fixed relationship to pulses of an internal clock running in the mouse. After a selected number of samples have been taken (i.e., at a time "Tmin"), the current sample is loaded into memory for later processing. After twice that many samples have been taken (i.e., 2×Tmin), the latest current sample is loaded into memory for quadrature calculation. After the LED pulse, the sample taken at the time Tmin is read by the microprocessor and determined if it is recognized as a digital "1" signal (i.e., above the microprocessor's threshold value). If the input at time Tmin was a digital "1," then the time Tmin is decremented one interval (i.e., Tmin=Tmin−1). The method continues for the next LED pulse.

Starting with a value of Tmin greater than that expected for any given device tolerance, the above method continues for each LED pulse until the Tmin value is decremented to the appropriate value for a particular input device. This method uses only one loop to determine if the currently selected time interval is equal to Tmin, and thus allows for a slower and cheaper microprocessor over most processors available. Alternatively, a low Tmin value may be initially selected, and the Tmin value incremented during each LED pulse until the appropriate Train value is achieved. In the preferred embodiment, a combination of both incrementing and decrementing methods is used.

In a first alternative embodiment, during each LED pulse, samples of the output from the photodetector are taken and loaded at each interval. After the LED pulse, the sample at the time interval Tmin is retrieved and determined whether it exceeded the threshold voltage (i.e., whether the sample is recognized as a digital "1"). If it did, the Tmin value is decremented by one interval. The sample at interval 2×Tmin is used for quadrature calculation as above. Additional random access memory ("RAM") may be required for this alterative embodiment. The method of this alterative embodiment loads RAM sequentially with no loops in the method and thus allows for a slower and cheaper microprocessor over most processors available.

In a second alternative embodiment, the Tmin value is both incremented and decremented over a period of time. If the value of Train is decremented too low under the above-described routine, a second routine is executed to increment the value of Tmin. In a third alternative embodiment, the present invention, rather than adjusting the time at which samples are taken, essentially adjusts the threshold voltage $V_{TH}$ to provide the desired 50% duty cycle.

Overall, all embodiments are error insensitive because they adjust the value Tmin by only one selected time interval during each LED pulse. If Tmin could be adjusted by more than one time interval during a single LED pulse, an unwanted noise signal from the photodetector output could decrement the Tmin value well below the threshold voltage value causing all samples to be read as a digital "0" input signal. Additionally, all embodiments require at most only one loop in the method. Consequently, a slower, and therefore less expensive, microprocessor may be used.

Overall, the present invention provides a method of providing input signals for an electrical component produced from optoelectronic device pairs having at least one light-emitting element and one light-detecting element. The method includes the steps of: selecting a first value of time (Tmin); activating the light-emitting element, causing it to emit light; selectively receiving the light from the light-emitting element by the light-detecting element; producing a signal by the light-detecting element in response to the selectively received light; and, storing first and second samples of the signal. The first sample is stored at the first value of time after activating the light-emitting element, and the second sample is stored at a second value of time, the second value of time having a relationship to the first value of time. The second sample is used as an input signal for the electrical component. Thereafter, the method includes the steps of: deactivating the light-emitting element; retrieving the first sample; comparing the first sample to a selected value; and, changing the Tmin value by at least one of a selected time interval if the first sample has a predetermined relationship to the selected value. Preferably, the first value is determined whether it is a digital "1" signal and if it is, the first value is decremented by one selected time interval.

The method of the present invention further includes the steps of counting at the selected time intervals until a count is approximately equal to the Tmin value, and waiting for a second value of time (equal to approximately twice the Tmin value). The first sample is stored when the count is approximately equal to the Tmin value, and the second sample is stored when the count is approximately equal to the second value of time. In a first alternative embodiment, the step of storing includes storing a series of samples during a series of the selected time intervals. The first and second samples are stored at time intervals approximately equal to the first and second value of times, respectively.

The present invention solves the problems of prior optoelectronic device circuits by using a noise-insensitive method of providing input signals to a microprocessor which do not require costly comparator circuits. Additionally, the present invention provides input signals to a microprocessor which are independent of the particular characteristics of the microprocessor and optoelectronic devices.

Other features and advantages of the present invention will become apparent from studying the following detailed description of the presently preferred exemplary embodiment, together with the following drawings.

DETAILED DESCRIPTION OF TH PRESENTLY PREFERRED EMBODIMENT

The present invention provides a method of producing input signals for an electrical component such as a microprocessor based on signals output from optoelectronic device pairs. Particularly, the present invention may be used for providing an equal distribution or series of digital "0" and "1" signals to a microprocessor or other electrical component from a series of analog pulses produced from the optoelectronic device pairs, when such an equal distribution is desired, but inhibited by variations in the output/input characteristics of the optoelectronic device pairs and/or microprocessor. By way of example, the present invention is described herein as being used in computer input devices. An equal distribution of "0" and "1" signals input to a microprocessor within the computer input device are required to accurately compute the magnitude and direction of the device's travel. To eliminate the comparators used in prior input devices while still compensating for variations in optoelectronic and microprocessor variations, the present invention measures the time at which the microprocessor measures a transition from a digital "0" to a "1" signal in the output signal from the optoelectronic device. The microprocessor then adjusts when a sample of the output signal is used to determine travel of the input device. The present invention has several advantages over prior approaches, for example, it is insensitive to noise and may be performed by relatively slow and inexpensive microprocessors.

Figures 1, 9:
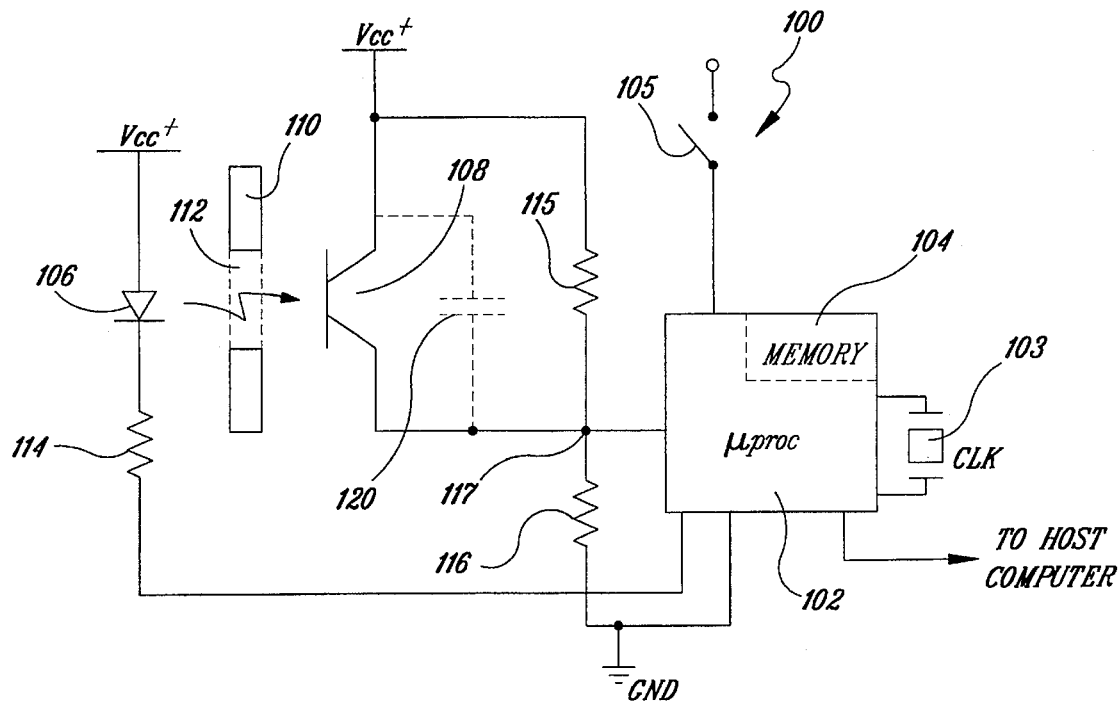
FIG. 1 is a schematic diagram of the computer input device of the present invention showing a portion of the circuitry of the device.
FIG. 9 is a table showing six samples of signals output from four photodetectors of FIG. 1.

As shown in FIG. 1, an input device, preferably a trackball or mouse 100, includes a microprocessor 102 having a clock 103 and on-chip memory 104 consisting of read-only memory and RAM. Off chip memory may also be used. Two optoelectronic device pairs are housed in the mouse 100. Each pair includes a light-emitting element, preferably an LED 106, and a photodetector, preferably a phototransistor 108, separated by an encoder wheel 110. A current limiting resistor 114 is coupled in series between one terminal of the LED 106 and the microprocessor 102. The other terminal of the LED 106 is coupled to a voltage supply Vcc+. A resistor 115, coupled between the voltage supply Vcc+ and the emitter of the phototransistor 108, and a resistor 116, coupled in series between the emitter terminal of the phototransistor 108 and ground, form a voltage divider network (discussed more fully below). The output terminal of the phototransistor 108, i.e., its emitter terminal, is also coupled to an input terminal 117 of the microprocessor 102.

The encoder wheel 110 consists of a wheel positioned at the end of a shaft (not shown). The encoder wheel 110 has a plurality of notches or holes 112 spaced equally about the wheel's circumference. As the mouse 100 is moved about a surface, a ball (not shown) contacting the surface and the shaft rotates, in turn rotating the shaft and thus the encoder wheel 110. As the encoder wheel 110 rotates, various amounts of light are transmitted from the LED 106 to the phototransistor 108 through the holes 112 in the encoder wheel 110.

The mouse 100 preferably includes at least two sets of LEDs, phototransistors and encoder wheels 106, 108 and 110, respectively. The shafts of the encoder wheels 110 are positioned 90° from each other and adjacent to the ball. As the mouse is moved in two dimensions, the ball rotates, the encoder wheels 110 rotate, and the phototransistors 108 receive pulses of light. These pulses of light are caused, in part, by the holes 112 and opaque regions of the encoder wheels 110 alternatively passing between the LEDs 106 and phototransistors 108. Each phototransistor 108 convert these pulses of light into pulsating electrical signals. One encoder wheel and optoelectronic pair cooperatively produce signals input to the microprocessor 102 which determine mouse movements along one axis (i.e., along the x axis or left to right), while the other encoder wheel and optoelectronic pair cooperatively produce signals input to the microprocessor 102 which determine mouse movements along another axis (i.e., the y axis or up and down).

The microprocessor 102 is capable of processing binary or digital input signals, i.e., "0" or "1" input signals. The microprocessor 102 has a threshold voltage $V_{TH}$ below which an input voltage signal is processed as a digital "0" input signal, and above which an input voltage signal is processed as a digital "1" input signal. As the encoder wheel 110 rotates, the phototransistor 108 receives pulsating amounts of light and outputs a pulsating voltage signal, the microprocessor 102 receives a series of digital "0" or "1" input signals depending upon whether the encoder wheel 110 is closed or open, respectively. Preferably, the microprocessor 102 processes the transitions between the string of "0s" and "1s," i.e., the changes from an input signal below the threshold voltage $V_{TH}$ to above $V_{TH}$.

While the phototransistor 108 is shown and described herein as a single phototransistor, the present invention preferably uses a single photodetector package having two phototransistors therein, such as the photodetector model number LTR-5576D manufactured by LITEON. Consequently, each photodetector outputs two voltage signals referred to herein as "quadrature signals". The photodetector positioned about the x axis encoder wheel 110 produces quadrature signals "XA" and "XB." The photodetector positioned about the y axis encoder wheel 110 produces quadrature signals "YA" and "YB." Thus, while only one input terminal 117 is shown in FIG. 1, the quadrature signals XA, XB, YA and YB output from four photodetectors 108 are input in parallel to the microprocessor 102 over four input terminals 117.

The two phototransistors 108 in each photodetector are separated by a known distance whereby when one phototransistor 108 in the package is positioned adjacent to one of the holes 112 to receive light from the LED 106, light to the other phototransistor 108 is blocked by the encoder wheel 110. As a result, the two signals output from the phototransistors 108 are in quadrature, that is, the signals are out of phase by 90°. The microprocessor 102 senses transitions between digital "0" and "1" input signals in these two quadrature signals. By comparing these transitions to, e.g., a look-up table, the microprocessor 102 determines the direction in which the mouse is being moved. For example, if the quadrature signals XA and XB output from the two phototransistors 108 are "00" followed by "10", then the microprocessor 102 recognizes that the mouse 100 is being moved in one direction along the X axis. Conversely, if the quadrature signals XA and XB are "11" followed by "10", then the microprocessor 102 recognizes that the mouse 100 is being moved in the opposite direction.

The number of transitions between digital "0" and "1" signals detected by the microprocessor 102 indicates the magnitude of mouse travel. Together, determination of direction and magnitude of mouse travel are referred to in the art as quadrature calculation. Quadrature calculation is performed by the microprocessor 102 using known techniques.

The microprocessor 102, after performing quadrature calculation, outputs a signal to the host computer, typically a 3 byte signal. At least one switch 105 is coupled to the microprocessor 102 for producing switch input signals. The first byte in the 3 byte signal therefore includes data indicating whether the switch 105 has been actuated, and possibly other information. The second and third bytes include count signals indicating movement of the mouse 100 in the x and y directions, respectively. The count signals are either positive or negative, indicating movement of the mouse 100 in either a forward or reverse direction along a particular axis. The host computer converts these counts into cursor movements on a visual display device. These counts and other mouse signals output to the host computer are preferably similar to the mouse signals described in *Microsoft Mouse Programmer's Reference*, Microsoft Press, 1991.

Figure 2:
FIG. 2 shows a typical light intensity output signal from a light-emitting diode of FIG. 1.

To reduce the amount of power consumed by the mouse 100, the LEDs 106 are pulsed for a fixed duration, preferably for a duration of 64 microseconds. The time between leading edges of sequential light pulses is preferably 200 microseconds. The LED 106 outputs a light pulse 2A having constant light intensity when activated, as shown in FIG. 2.

The phototransistor 108 contains an internal parasitic capacitance represented in FIG. 1 as a capacitor 120 shown in dashed lines. The internal capacitance 120 of the phototransistor 108 may hold a charge between pulses of the LED 106 resulting in erroneous quadrature signal readings by the microprocessor 102. To reduce the effects of this internal capacitance 120, the output of the phototransistor 108 is pulled low by changing the input terminal 117 of the microprocessor 102 to an output terminal between each light pulse 2A. Several microprocessors currently available provide at least four terminals that are programmable to serve as either input or output terminals. The present invention preferably uses a Z86C17 microprocessor manufactured by Zilog. When the terminal 117 is switched to an output terminal, the effective impedance at this terminal is very low, thus draining any charge on the parasitic capacitance 120 to ground.

Figure 3:
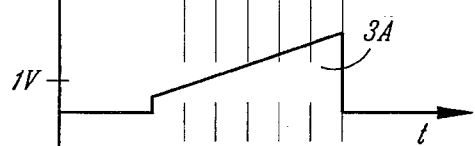
FIG. 3 shows a typical signal output from a photodetector of FIG. 1.

When the LED 106 is activated, the phototransistor 108 is initially off. Upon receiving light from the LED 106, the photodetector's output signal will not reach its final value immediately, but will linearly increase and slope upward until its final value is reached (as shown in FIG. 3 as pulse 3A). The parasitic capacitance 120, together with the LED pulses 2A, produce a sawtooth-shaped output signal from the phototransistor 108.

The voltage divider network formed by the resistors 115 and 116 precharges the phototransistor 108 to a known voltage, shown in FIG. 3 as an initial step in the output voltage pulse 3A. When the microprocessor 102 switches the terminal 117 from an output to an input and the LED 106 is turned on, the voltage at the output terminal to the phototransistor 108 is allowed to increase to the known precharge voltage. For a threshold voltage $V_{TH}$ of approximately 2 volts, a precharge voltage of approximately 0.5 volts is preferred. Precharging helps drive the output voltage signal of the phototransistor 108 closer to the microprocessor's threshold voltage $V_{TH}$, allowing a shorter LED pulse 2A. A shorter LED pulse 2A helps to further reduce the mount of power consumed by the mouse 100. Precharging also allows the microprocessor 102 to sample the output signal of the phototransistor 108 during a shorter time interval, as will be discussed more fully below. By precharging the phototransistor 108, the sawtooth-shaped output signal of the photodetector becomes a more trapezoid-shaped output signal as shown in FIG. 3.

The slope of the output voltage pulse 3A of the phototransistor 108 is proportional to, among other things, the light intensity reaching the phototransistor 108 from the LED 106. The phototransistor 108 receives varying amounts of light from the LED 106 depending upon whether the encoder wheel 110 is "open", "closed" or in some position therebetween. When the encoder wheel 110 is positioned such that one of the holes 112 is positioned fully between the LED 106 and the phototransistor 108 (i.e., the encoder wheel is "fully open"), the phototransistor 108 receives a maximum amount of light and outputs a signal having a steep slope, shown as a voltage output pulse 4A in FIG. 4. If the encoder wheel 110 is positioned such that one half of a notch 112 separates the phototransistor 108 and the LED 106 (i.e., the encoder wheel is "half open"), the phototransistor 108 outputs a pulse signal having a slope approximately half that of the fully open position, shown as a voltage output pulse 4B. If the wheel is placed such that light from the LED 106 is completely blocked (i.e., the encoder wheel is "fully closed"), the phototransistor 108 outputs a pulse signal having almost zero slope, shown as a voltage output pulse 4C. As the mouse 100 moves at typical speeds, the encoder wheel 110 rotates continuously from a fully open position to a fully closed position, the phototransistor 108 outputs a continuous series of pulse signals having decreasing slope, from the pulse 4A to the pulse 4C, as the LED 106 outputs a rapid series of the pulses 2A.

The series of pulses output from the phototransistor 108, and input to the microprocessor 102, is an analog signal. To avoid using comparator circuitry to convert this analog signal to a digital signal, the microprocessor 102 of the present invention performs quadrature calculations on a sample of each output pulse from the phototransistor 108. The analog signal output from the phototransistor 108 is not converted to digital signals for the microprocessor 108, rather, a sample of that output signal from the photodetector is processed. If this sample is greater than the threshold voltage $V_{TH}$ of the microprocessor 102, then a digital "1" signal is used for quadrature calculation.

Figure 4:
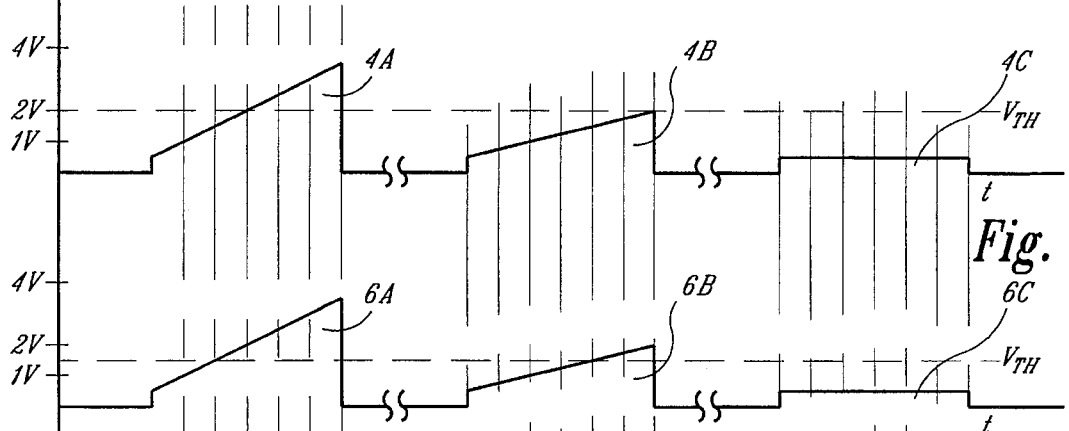
FIG. 4 shows a typical series of signals output from the photodetector of FIG. 1 for several levels of light it receives.

Ideally, when the encoder wheel 110 is fully open, the output pulse 4A slopes upwardly from approximately 0.5 volts to 3.5 volts during the LED light pulse 2A. The threshold voltage $V_{TH}$ of the microprocessor 102 is 2 volts, as shown in FIG. 4. When the encoder wheel is more than half open, the phototransistor 108 outputs a steep sloped signal pulse having a shape between the shapes of the pulses 4A and 4B. This steep sloped pulse peaks at greater than 2 volts. The microprocessor 102 takes a sample of the peak of this pulse and processes it as a digital "1" input signal.

When the encoder wheel is half closed or less, the phototransistor 108 outputs a flatter sloped pulse signal having a slope between the pulses 4B and 4C. This pulse peaks at 2 volts or less, and thus the sample taken by the microprocessor 102 is equal to or less than $V_{TH}$. The microprocessor never senses an input voltage signal greater than $V_{TH}$ and therefore processes a digital "0" input signal. Overall, the mouse 100 ideally has a duty cycle of 50%: as the mouse 100 is moved at a constant speed, the encoder wheel 110 is 50% of the time half open or more and 50% of the time half closed or less resulting in an equal distribution of digital "0" and "1" signals processed by the microprocessor 102.

Unfortunately, in each mouse, the threshold voltage $V_{TH}$ of the microprocessor 102 varies. For example, a threshold voltage $V_{TH}$ of less than 2 volts causes a predominance of digital "1" signals processed by the microprocessor 102 because the peak of the output pulse from the phototransistor 108 will exceed $V_{TH}$ even with the encoder wheel 110 less than half open. Additionally, the gain of each photodetector and the light intensity output of each LED varies causing an unequal distribution of digital "0" and "1" signals processed by the microprocessor 102. Consequently, each mouse 100 manufactured using optoelectronic pairs with microprocessors varies from the ideal, and each mouse must be adjusted to provide the above-described 50% duty cycle.

Figure 5:
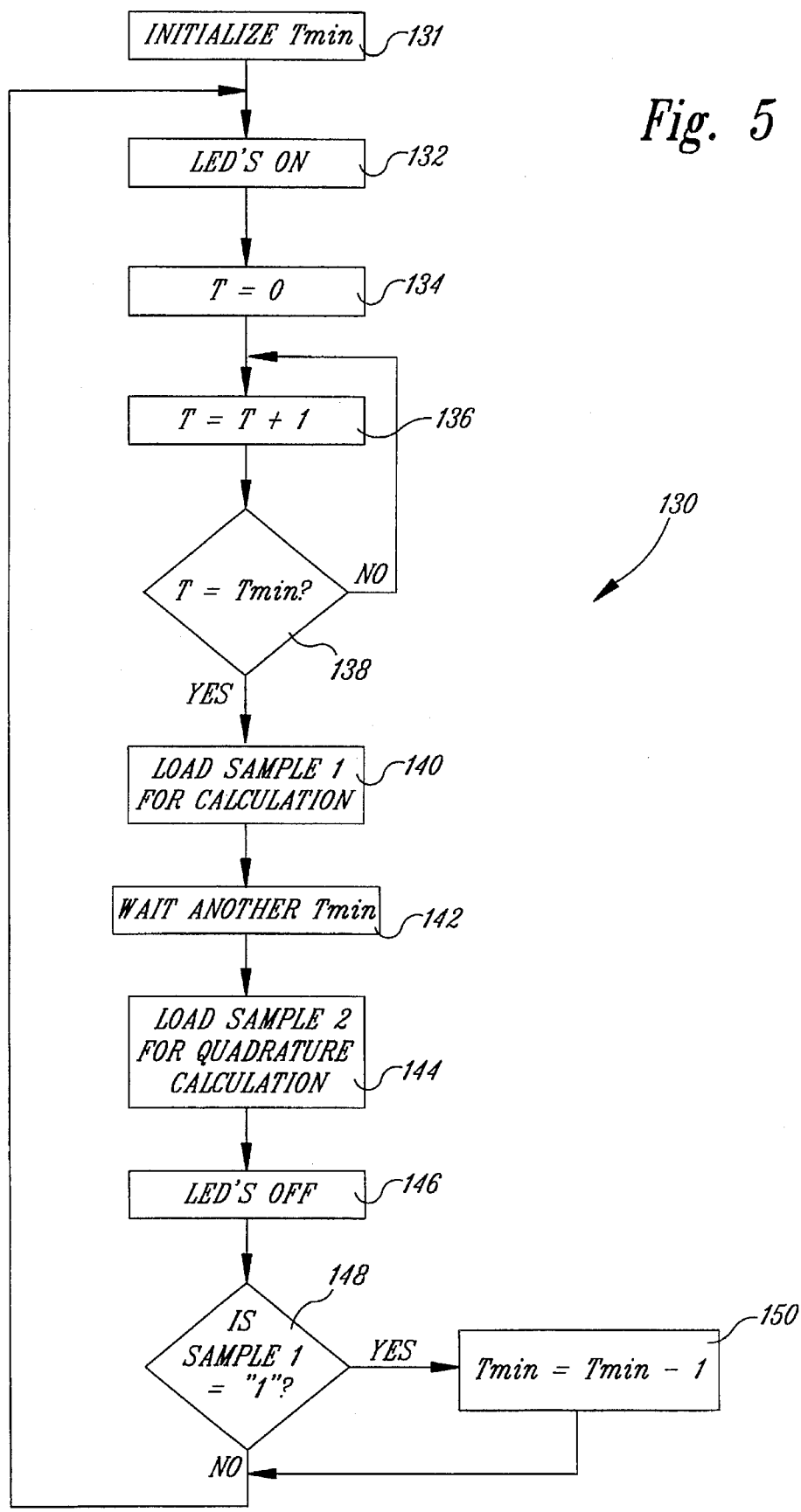
FIG. 5 is a flowchart showing an example of instructions executed by the input device of FIG. 1.

To compensate for microprocessor and optoelectronic device variations, the microprocessor 102 of the present invention executes a routine to adjust its duty cycle such that an equal distribution of digital "1" and "0" signals are processed for each quadrature signal, i.e., a digital "1" signal is processed when the encoder wheel 110 is more than half open, and a digital "0" signal is processed otherwise. An example of such a routine is shown in FIG. 5 as a routine 130 stored in the memory 104 of the mouse 100. The routine 130 determines the time it takes for the output of the phototransistor 108 to cross the voltage threshold $V_{TH}$ of the microprocessor 102 (i.e., the time it takes for the microprocessor 102 to process a digital "1" input signal) when the encoder wheel 110 is fully open. During a given LED pulse 2A, the slope of the output pulse 3A from the phototransistor 108 depends on how open the encoder wheel 110 is. When the encoder wheel 110 is fully open, the steep slope of the output pulse 4A causes the phototransistor 108 to output a signal of greater than 2 volts at approximately one-half the duration of the LED pulse 2A. For a LED pulse 2A of 64 microseconds in duration, the phototransistor 108 outputs a signal of greater than 2 volts at approximately 32 microseconds after the beginning of the LED pulse 2A.

When the encoder wheel 110 is slightly more than half open, the slope of the output pulse 4B is slightly more than one-half that of the output pulse 4A. Consequently, the phototransistor 108 outputs a signal of greater than 2 volts at approximately the end of the duration of the LED pulse 2A. For an LED pulse 2A of 64 microseconds, the phototransistor 108 outputs a signal of greater than 2 volts at approximately 64 microseconds after the beginning of the LED pulse 2A. If the microprocessor 102 does process a digital "1" input signal from the phototransistor 108 at one-half the duration of the LED pulse 2A when the encoder wheel 110 is fully open, the microprocessor 102 adjusts when the sample of the signal output from the phototransistor 108 is taken and processed for quadrature calculation, as described below.

With reference to FIG. 5, the routine 130 begins in step 131 by initializing the microprocessor 102 with a time value Tmin. Tmin is a variable having an initially selected value stored in the memory 104. Tmin is preferably initially selected at a maximum expected value for optoelectronic device variation, i.e., Tmin is initialized to ensure that a predominance of digital "1" input signals are processed by the microprocessor 102 before an appropriate value for Tmin is obtained. For example, with an optoelectronic pair including an LED having a weak light intensity output and a low gain photodetector, the photodetector will output a voltage approximately equaling $V_{TH}$ with the encoder wheel 110 fully open at the midpoint of the duration of the LED pulse 2A. Therefore, Tmin is preferably set at a value between one-half the duration of the pulse and the full duration of the pulse 2A. For an LED pulse 2A of 64 microseconds in duration, a Tmin value of approximately 32 microseconds is preferred.

In step 132, the LED 106 is activated, causing it to emit light such as the pulse 2A. In step 134, the microprocessor 102 resets a counter to 0. In step 136, the counter is incremented by one time interval. Because the microprocessor 102 is unable to continuously process the signals output from the phototransistor 108, it processes discrete samples of the signals at regular periods. Therefore, the "time interval" corresponds to the period between two samples processed by the microprocessor 102. The minimum value of the time interval is determined by the minimum time allowable to process an input signal for a particular type of microprocessor. The time interval is preferably set close to this minimum allowable time interval in order to allow the greatest number of samples of the output signal to be taken from the phototransistor 108. By allowing the greater number of samples of the output signal to be taken from the phototransistor 108, the present invention may accommodate a greater range of variations in microprocessors and optoelectronic devices, and provide high resolution for the mouse 100. In the present invention, the time interval is preferably 4 microseconds, and thus for a 64 microsecond pulse, 16 time intervals or samples may be taken for each pulse.

In step 138, the current value of the counter is compared to Tmin. If the current value of the counter is not equal to Tmin, the routine 130 loops back to step 136 and increments the counter by another time interval. If the counter equals Tmin, then in step 140, the output of the phototransistor 108 is sampled and this sample, a "sample 1," is loaded in the memory 104.

In step 142, the microprocessor 102 waits for another time period equal to Tmin (i.e., 2×Tmin from the point when the counter was initialized in step 134) using the same steps that were used to wait for the first Tmin (i.e., 134–138). Then, in step 144, a second sample of the output from the phototransistor 108, a "sample 2," is loaded in the memory 104. The sample 2 is used by the microprocessor 102 for quadrature calculations in a conventional manner to determine mouse movement. Thereafter, in step 146, the LED 106 is deactivated or turned off.

In step 148, the microprocessor 102 retrieves the sample 1 from the memory 104 and determines whether the sample is recognized as a digital "0" or "1" signal by the microprocessor. In other words, the microprocessor 102 determines if sufficient light was received by the phototransistor 108 at time Tmin to produce a voltage greater than the microprocessor's threshold voltage $V_{TH}$. If the sample 1 is recognized by the microprocessor 102 as a "1" input, then, in step 150, the value Tmin is decremented by one time interval (i.e., Tmin=Tmin−1).

Figure 6:
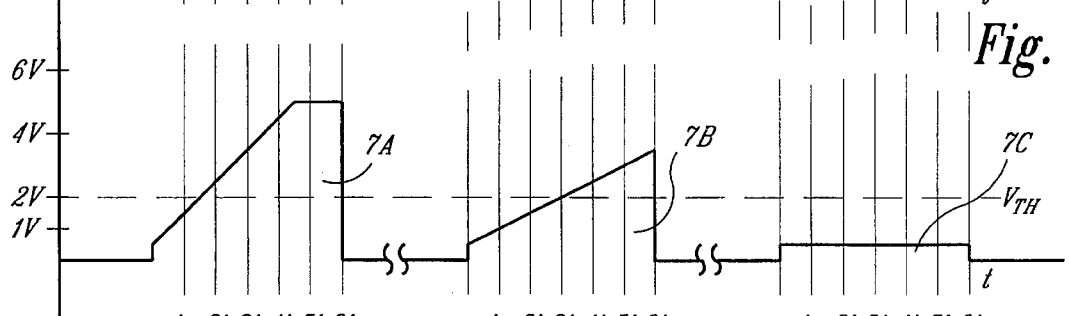
FIG. 6 shows a typical series of signals output from the photodetector, wherein the microprocessor processor of FIG. 1 has a lower than average threshold voltage.
Figure 7:
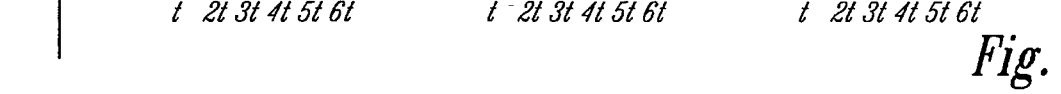
FIG. 7 shows a typical series of signals output from the photodetector, wherein the photodetector and/or LED has a higher than average gain.

Applying the routine 130 to the pulses 4A, 4B and 4C from the phototransistor 108 shown in FIG. 4, Tmin is set at 3t (step 131). For the pulses shown in FIG. 4, and in the other figures, only six time intervals are shown as t-6t. While the present invention preferably includes 16 time intervals for each LED light pulse 2A, 6 time intervals adequately describe the details of the present invention. Additionally, while only three types of pulses are shown in FIGS. 4, 6 and 7 (i.e., fully open, half open and fully closed), the phototransistor 108 outputs a continuum of intermediate pulses between the three types of pulses shown. Three such pulses are, however, adequate to describe the present invention.

For the pulse 4A, when the counter counts up to 3t, the microprocessor 102 loads a sample of the output signal from the phototransistor 108 into the memory 104 as the sample 1 (step 140). When the counter counts up to twice Tmin, or 6t, the microprocessor 102 loads another sample of the output signal from the phototransistor 108 as the sample 2 into the memory 104 (step 144). For the pulse 4A, the phototransistor 108 outputs a signal of approximately 3.5 volts at time 6t. The sample 2 has a voltage greater than the threshold voltage $V_{TH}$ (2 volts) and therefore is recognized as a digital "1" signal by the microprocessor 102. The microprocessor 102 uses the sample 2 for quadrature calculation.

In step 148, the microprocessor 102 retrieves the sample 1 from the memory 104 and determines if it is a digital "1" signal. For the pulse 4A, the phototransistor 108 outputs a signal of 2 volts at time 3t which equals but does not exceed the threshold voltage $V_{TH}$. Therefore, the microprocessor 102 recognizes the sample 1 as a digital "0" signal. Tmin maintains its value of 3t, and the routine 130 loops back to step 132 where the LED 106 is again illuminated.

Applying the routine 130 to the pulses 4B and 4C, the phototransistor 108 outputs, and the microprocessor 102 loads as the sample 1, signals of 1.25 and 0.5 volts, respectively, at time Tmin or 3t. Both of these sample 1 signals are below $V_{TH}$ and the microprocessor 102 recognizes them as digital "0" signals. Tmin thus maintains its present value of 3t when the encoder wheel 110 is either half open or fully closed for the pulses 4B and 4C, respectively. The phototransistor 108 outputs, and the microprocessor 102 loads as the sample 2, signals of 2 and 0.5 volts, for the pulses 4B and 4C respectively, at time twice Tmin or 6t. Neither of these sample 2 signals have voltages exceeding $V_{TH}$ and the microprocessor 102 recognizes them as digital "0" signals for quadrature calculation.

For the example of output pulses shown in FIG. 6, the microprocessor 102 has a threshold voltage $V_{TH}$ below 1.5 volts. A typical series of output voltage signals from the phototransistor 108 are shown: a pulse 6A when the encoder wheel 110 is fully open, a pulse 6B when the encoder wheel is half open, and a pulse 6C when the encoder wheel is fully closed. Applying the routine 130, Tmin is again set at 3t in step 131. For the pulse 6A, when the counter counts up to 3t, the microprocessor 102 loads a sample of the output signal from the phototransistor 108 into the memory 104 as the sample 1 in step 140. When the counter counts up to twice Tmin, or 6t, the microprocessor 102 loads another sample of the output signal from the phototransistor 108 as the sample 2 into the memory 104 in step 144. For the pulse 6A, the phototransistor 108 outputs a signal of approximately 3.5 volts at time 6t. The sample 2 has a voltage greater than the threshold voltage $V_{TH}$ and therefore is recognized as a digital "1" signal by the microprocessor 102.

In step 148, the microprocessor 102 retrieves the sample 1 from the memory 104 and determines whether it is a digital "1" signal. For the pulse 6A, the phototransistor 108 outputs a signal of 2 volts at time 3t, which is greater than the threshold voltage $V_{TH}$. Therefore, the microprocessor 102 recognizes the sample 1 as a digital "1" signal. As a result, in step 150, the microprocessor decrements the value of Tmin by 1 time interval, resulting in a Tmin value of 2t.

The routine 130 loops back to step 132, and steps of the routine are repeated. Then for the next pulse, which will typically be similar to pulse 6A, when the counter counts up to 2t (steps 134–138), the microprocessor 102 loads a sample of the output signal from the phototransistor 108 into the memory 104 as the sample 1 (step 140). When the counter counts up to twice Tmin or 4t, the microprocessor 102 loads another sample of the output signal from the phototransistor 108 as the sample 2 in the memory 104 (step 144). For the pulse 6A, the phototransistor 108 outputs a signal of approximately 2.5 volts at time 4t. The sample 2 has a voltage greater than the threshold voltage $V_{TH}$ and therefore the microprocessor 102 recognizes it as a digital "1" signal.

In step 148, the microprocessor 102 retrieves the sample 1 from the memory 104 and determines whether it is a digital "1" signal. For the pulse 6A, the phototransistor 108 this time outputs a signal of approximately 1.25 volts at time 2t, which is slightly less than the threshold voltage $V_{TH}$. Therefore, the sample 1 is recognized by the microprocessor 102 as a digital "0" signal. Tmin maintains its current value of 2t, and the routine 130 loops back to step 132 where the LED 106 is again illuminated.

Assuming that Tmin has not already been adjusted as above, for the pulses 6B and 6C, the phototransistor 108 outputs signals of 1.25 and 0.5 volts, respectively, at time Tmin or 3t (step 140). Both of these signals are less than $V_{TH}$ and the microprocessor 102 recognizes them as digital "0" signals (step 148). Tmin thus maintains its value of 3t when the encoder wheel 110 is either half open or fully closed. The phototransistor 108 outputs, and the microprocessor 102 loads as the sample 2, signals of 2 and 0.5 volts, for the pulses 6B and 6C, respectively, at time 6t. These signals have voltages greater than and less than $V_{TH}$, respectively, and the microprocessor 102 recognizes them as digital "1" and "0" signals for quadrature calculation, respectively. If Tmin had previously been adjusted due to the pulse 6A, the phototransistor 108 would output signals of approximately 1 and 0.5 volts for the pulses 6B and 6C, respectively, at Tmin=2t.

For the example of output pulses shown in FIG. 7, the phototransistor 108 outputs pulses having a much greater slope than the previous examples because of either the LED 106 outputting greater than the average light intensity compared to the specifications for that type of LED, the phototransistor 108 having greater than average gain compared to the specifications for that type of phototransistor, or a combination of both. A series of output voltage pulses from the phototransistor 108 are shown: a pulse 7A when the encoder wheel 110 is fully open, a pulse 7B when the encoder wheel is half open, and a pulse 7C when the encoder is fully closed. Applying the routine 130, Tmin is again set at 3t in step 131. For the pulse 7A, when the counter counts up to 3t, the microprocessor 102 loads a sample of the output signal from the phototransistor 108 into the memory 104 as the sample 1 (step 140). When the counter counts up to twice Tmin, or 6t, the microprocessor 102 loads another sample of the output signal from the phototransistor 108 as the sample 2 in the memory 104 (step 144). For the pulse 7A, the phototransistor 108 outputs a signal leveling off at approximately 5 volts beginning at time 4.5t. The phototransistor 108 saturates near $V_{cc}+$ which is approximately equal to 5 volts. The sample 2 has a voltage greater than the threshold voltage $V_{TH}$ and therefore the microprocessor 102 recognizes it as a digital "1" signal.

In step 148, the microprocessor 102 retrieves the sample 1 from the memory 104 and determines whether it is a digital "1." For the pulse 7A, the phototransistor 108 outputs a signal of approximately 3.5 volts at time 3t, which is greater than the threshold voltage $V_{TH}$. Therefore, the microprocessor 102 recognizes the sample 1 as a digital "1" signal. As a result, in step 150, the microprocessor 102 decrements the value of Tmin by 1, resulting in a Tmin value of 2t.

The routine 130 loops back to step 132, and the steps of the routine are repeated. For a similar pulse 7A, when the counter counts up to 2t, the microprocessor 102 loads a sample of the output signal from the phototransistor 108 into the memory 104 as the sample 1 (step 140). When the counter counts up to twice Tmin, or 4t, another sample of the output signal from the phototransistor 108 is loaded as the sample 2 in the memory 104 (step 144). For the pulse 7A, the phototransistor 108 outputs a signal of approximately 4.5 volts at time 4t. The sample 2 has a voltage greater that the threshold voltage $V_{TH}$ and therefore is recognized as a digital "1" signal by the microprocessor 102 for quadrature calculation.

The sample 1 is retrieved from the memory 104 and determined whether it is a digital "1" signal (step 148). For the pulse 7A, the phototransistor 108 outputs a signal of approximately 2.5 volts at time 2t, which is slightly greater than the threshold voltage $V_{TH}$. Therefore, the sample 1 is recognized by the microprocessor 102 as a digital "1" signal again. Tmin is decremented by 1 time interval, resulting in a Tmin value of t.

The routine 130 loops back to step 132, and the steps of the routine are repeated again. For a similar pulse 7A, the phototransistor 108 outputs a signal of 1.5 and 2.5 volts at times t and 2t, which are loaded as the samples 1 and 2, respectively. The sample 2 has a voltage greater than the threshold voltage $V_{TH}$ and therefore is recognized as a digital "1" signal by the microprocessor 102 for quadrature calculation. The sample 1 is slightly less than the threshold voltage $V_{TH}$. The sample 1 is recognized by the microprocessor during this third loop through the routine 130 as a digital "0" signal. Tmin thus maintains its value of t. The routine 130 again loops back to step 132. Therefore, in this example involving a sequence of pulses similar to the pulse 7A, two iterations of the routine 130 are required to reduce the initial value of Train (3t) to its appropriate adjusted value (t).

Assuming Train has not already been adjusted as above, for the pulses 7B and 7C, the phototransistor 108 outputs, and the microprocessor 102 loads as the sample 1, signals of approximately 2 and 0.5 volts, respectively, at time Tmin or 3t. Neither of these sample 1 signals have voltages greater than the threshold voltage $V_{TH}$ and the microprocessor 102 recognizes them similarly as digital "0" signals. Train thus maintains its present value of 3t for the pulses 7B and 7C when the encoder wheel 110 is either half open or fully closed. The phototransistor 108 outputs, and the microprocessor 102 loads as the sample 2, signals of 3.5 and 0.5 volts, respectively, at time twice Tmin or 6t. The first of these sample 2 signals has a voltage greater than $V_{TH}$ and the microprocessor 102 recognizes it as a digital "1" signal. The second sample 2 signal has a voltage less than $V_{TH}$ and the microprocessor 102 recognizes it as a digital "0" signal. If Tmin had previously been adjusted due to the pulse 7A, the phototransistor 108 would output signals of approximately 1 and 0.5 volts for the pulses 7B and 7C, respectively, at Tmin=t.

Experimentation has found that steep sloped output pulses such as the pulse 7A do not occur infrequently. With such steep pulses, it is possible for the photodetector 108 output to equal $V_{TH}$ at a time slightly before 2t. At 2t, the output of the phototransistor 108 just barely crosses the threshold $V_{TH}$. Experimentation has shown that in this situation, where the output of the phototransistor 108 just barely crosses the threshold voltage $V_{TH}$ at time 2t, a 50% duty cycle is not achieved. Consequently, to compensate for steep sloped output pulses, the present invention preferably stores the sample 1 at time Tmin−t. Thus in step 138, the counter counts up to T=Tmin−t, and then loads sample 1 for calculation in step 140.

As noted above, the four phototransistors used in the mouse 100 output the four quadrature signals XA, XB, YA, and YB. The microprocessor 102 performs the routine 130 on all four quadrature signals to "calculate" an appropriate Tmin value for each quadrature signal to ensure that each quadrature signal has the desired 50% duty cycle. While the preceding discussion describes the calculation of only one Tmin value for one quadrature signal, those skilled in the relevant art will recognize that the routine 130 is to be similarly and sequentially executed to determine separate Tmin values for the other three quadrature signals (e.g., producing values $Tmin_{XA}$, $Tmin_{XB}$, $Tmin_{YA}$ and $Tmin_{YB}$).

Figure 8:
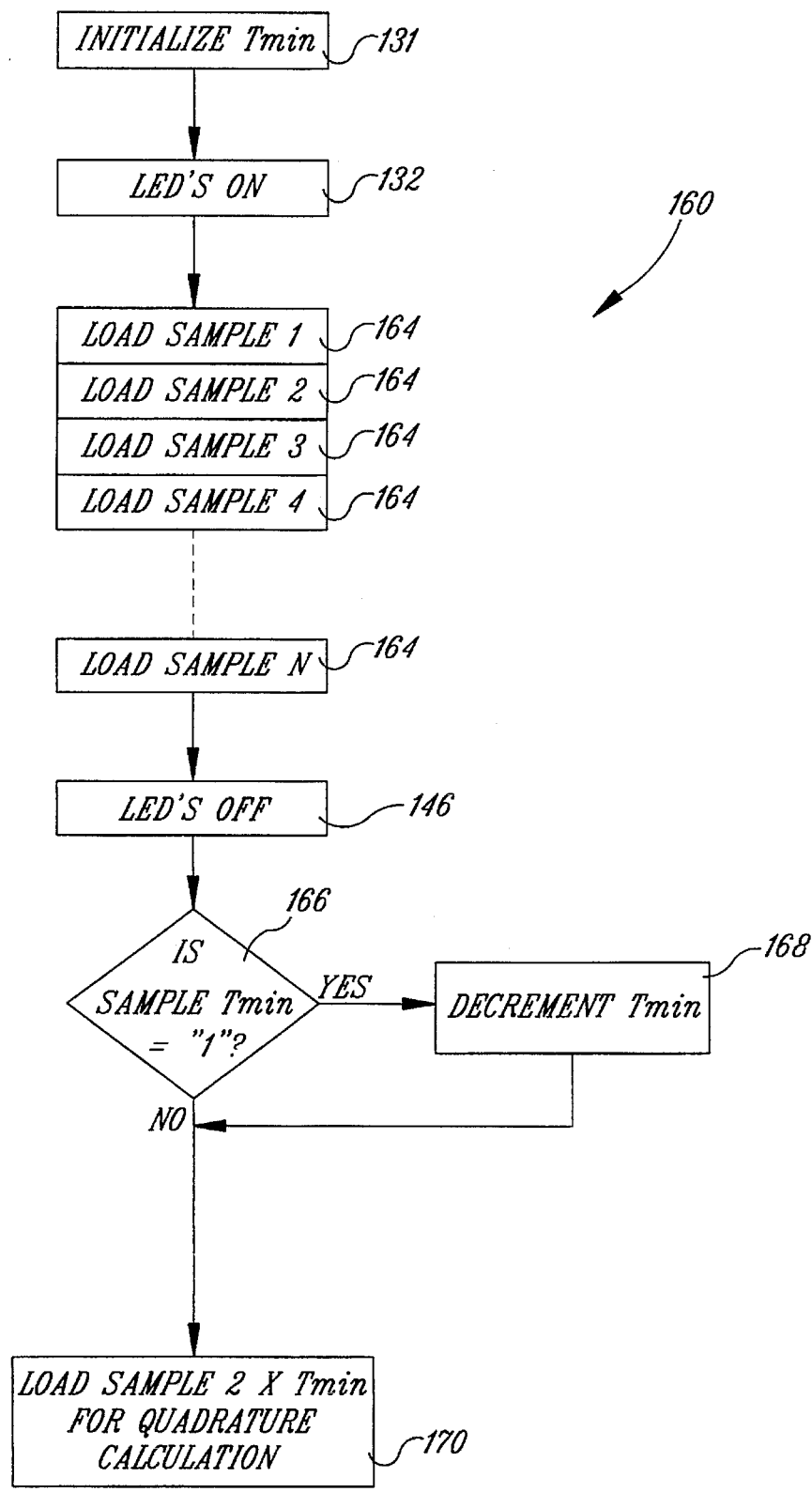
FIG. 8 is a flowchart of a first alternative embodiment of instructions executed by the input device of FIG. 1.

A first alternative embodiment according to the present invention for compensating for optoelectronic device variations is shown in FIG. 8 as a routine 160. This and other alternative embodiments are substantially similar to the previously described embodiment, and common elements or steps are identified by the same numbers. Only the differences in construction or operation are described in detail.

In a series of steps all labeled as 164, the microprocessor 102 loads in the memory 104 as a series of samples, the output signal from the phototransistor 108 at each time interval t until the LED 106 is deactivated in step 146. In step 166, the microprocessor 102 retrieves the particular sample loaded at time Tmin and determines whether it is a digital "1" signal. If not, then the microprocessor 102 retrieves the sample loaded at time 2×Tmin and uses it for quadrature calculation in step 170.

If the sample loaded at Tmin is recognized by the microprocessor 102 as a digital "1" signal, then in step 168, the value of Tmin is decremented by one time interval. Thereafter, the sample loaded at time twice Tmin is used for quadrature calculation in step 170.

Applying the routine 160 to the pulses 4A through 4C output from the phototransistor 108, Tmin is set at 3t (step 131). For the pulse 4A, the microprocessor 102 loads samples of the output signal from the phototransistor 108 into the memory 104 as samples 1, 2, 3, 4, 5 and 6 at time intervals t, 2t, 3t, 4t, 5t and 6t, respectively (steps 164). In step 166, the microprocessor 102 retrieves the sample loaded at time Tmin (i.e., the sample 3) and determines if it is a digital "1" signal. For the pulse 4A, the phototransistor 108 outputs a signal of 2 volts at time 3t, which equals but does not exceed the threshold voltage of $V_{TH}$. Therefore, the sample 3 is recognized by the microprocessor 102 as a digital "0" signal. Tmin maintains its value of 3t. In step 170, the microprocessor 102 retrieves the sample loaded at 6t (i.e., sample 6) from the memory 104 for quadrature calculation.

Applying the routine 160 to the pulses 4B and 4C, the microprocessor 102 loads two samples at time 3t (i.e., sample 3) having values of 1.25 and 0.5 volts, respectively, for these pulses. Both of these samples have voltages less than $V_{TH}$ and the microprocessor 102 recognizes them as digital "0" signals (step 166). Tmin thus maintains its present value of 3t. The two samples at time 6t have values of 2 and 0.5 volts for the pulses 4B and 4C, respectively. Neither of these samples have voltages greater than $V_{TH}$ and the microprocessor 102 recognizes them as digital "0" signals for quadrature calculation (step 170).

Applying the routine 160 to the pulse 6A, the microprocessor 102 loads samples of the output signal from the phototransistor 108 into the memory 104 as samples 1–6 at time intervals t–6t, respectively (steps 164). In step 166, the microprocessor 102 retrieves the sample loaded at time Tmin (i.e., the sample 3) and determines if it is a digital "1" signal. For the pulse 6A, the phototransistor 108 outputs a signal of 2 volts at time 3t which is slightly greater than the threshold voltage $V_{TH}$. Therefore, the sample 3 is recognized by the microprocessor 102 as a digital "1" signal. Tmin is decremented by one time interval in step 168, resulting in a Tmin value of 2t.

The routine 160 loops back to step 132, and the steps of the routine are repeated. For a similar pulse 6A, the sample 3 is loaded (step 164), then retrieved and determined if it recognized by the microprocessor 108 as a digital "1" signal (step 166). For the pulse 6A, the phototransistor 108 this time outputs a signal of approximately 1.25 volts at time 2t, which is slightly less than the threshold voltage $V_{TH}$. Therefore, the sample 3 is recognized by the microprocessor 102 as a digital "0" signal. Tmin maintains its current value of 2t, and the routine 160 loops back to step 132 where the LED 106 is again illuminated.

Assuming Train has not already been adjusted, applying the routine 160 to the pulses 6B and 6C, the microprocessor 102 retrieves the two samples loaded at time 3t, that have values of 1.25 and 0.5 volts for these pulses, respectively (step 166). Both of these samples have voltages less than $V_{TH}$ and the microprocessor 102 recognizes them as digital "0" signals. Tmin thus maintains its present value of 3t. The two samples loaded at time 6t have values of 2 and 0.5 volts for the pulses 6B and 6C, respectively. These samples have voltages greater than and less than $V_{TH}$, respectively, and the microprocessor 102 recognizes them as digital "1" and "0" signals for quadrature calculation, respectively (step 170).

Applying the routine 160 to the pulse 7A, in step 166, the microprocessor 102 retrieves the sample 3 and determines if it is a digital "1" signal. For the pulse 7A, the phototransistor 108 puts a signal of 3.5 volts at 3t, which is greater than the threshold voltage $V_{TH}$. Therefore, the sample 3 is recognized by the microprocessor 102 as a digital "1" signal, and the value of Tmin is decremented by 1 in step 168, resulting in a Train value of 2t. In step 170, the microprocessor 102 retrieves the sample 6 t from memory 104 for quadrature calculation.

Assuming Tmin has not already been adjusted, applying the routine 160 to the pulses 7B and 7C, the two samples loaded at time 3t have values of 2 and 0.5 volts, respectively, for these pulses. Neither of these samples have voltages greater than $V_{TH}$ and the microprocessor 102 recognizes them as digital "0" signals (step 166). Tmin thus maintains its present value of 3t. The two samples loaded at time 6t have voltages of 3.5 and 0.5 volts for the pulses 7B and 7C, respectively, and are used for quadrature calculation (step 170).

In the routine 160, after time Tmin, only even-numbered samples are required to be loaded in the memory 104, because only even-numbered values loaded at twice Tmin are retrieved. Samples loaded at odd values such as 5t, 7t, 9t and so forth will never be retrieved from the memory 104. To maintain proper timing, however, the load steps or "instructions" executed by the microprocessor 102 for these time increments must still be executed, or instructions requiring similar amounts of microprocessor time must be substituted in their place to maintain proper timing of instructions in the routine 160. By eliminating the need to load samples at odd time intervals after Tmin, less memory 104 is required by the routine 160.

Tmin need not be compared to a digital "1" signal, or "calculated," each time quadrature calculations are made. For example, to decrease the time required to execute the routines 130 or 160, the value of Tmin could be calculated alternatively along the X and Y axes. Tmin could be first calculated along the X-axis using one set of LEDs 106, photodetectors 108 and encoder wheels 110 (i.e., for quadrature signals XA and XB). The next iteration of the routine 130 could be used to calculate a Tmin value for the Y axis (i.e., for quadrature signals YA and YB). Additionally, the routine 160 allows one set of samples taken of the output pulses from the four phototransistors 108 to be used to calculate Tmin for all four quadrature signals. As noted above, four quadrature signals (i.e., XA, XB, YA, and YB) are input to the microprocessor 102 in parallel. During each load step 164, a 4-bit word is stored in the memory 104.

FIG. 9 shows an example of a series of six 4-bit words stored as samples 1 through 6 during the time intervals t through 6t, respectively, for the four quadrature signals XA, XB, YA, and YB. In the example shown in FIG. 9, the encoder wheels 110 are fully closed to one-half open with respect to three phototransistors 108, producing quadrature signals or XA, YA, and YB output pulses similar to the pulse 4B. The fourth phototransistor is at least one-half open by its respective encoder wheel 110 and thus produces a quadrature signal XB pulse similar to the pulse 4A. Once samples 1 through 6 have been stored in the memory 104 under step 164, the microprocessor 102 retrieves the desired sample, and using bit masks, compares a particular quadrature signal to determine if it is a digital "1" signal. For example, if Tmin is set at 3t (step 131) for all four Tmin values, and sample 3 is stored at time 3t (step 164), the microprocessor 102 retrieves the sample 3 in step 166. The microprocessor 102 determines whether the first quadrature signal XA at time 3t is greater than the threshold voltage $V_{TH}$. The microprocessor 102 does this by determining whether the first bit in the sample 3 word is a digital "1" signal (step 166). As shown in FIG. 9, the first bit in the sample 3 word is a digital "0" signal, and thus, $Tmin_{XA}$ maintains its present value of 3t for the first quadrature signal XA.

Thereafter, the microprocessor 102 determines whether the second quadrature signal XB at time 3t outputs a signal greater than the threshold voltage $V_{TH}$. The microprocessor 102 does this by determining whether the second bit in the sample 3 word is a digital "1" signal in a repeat of step 166. As shown in FIG. 9, the second bit in the sample 3 word is a digital "1" signal, and therefore, the microprocessor 102 decrements the value of $Tmin_{XB}$ by one-time interval, resulting in a new $Tmin_{XB}$ value of 2t. The microprocessor 102 performs the same steps for the third and fourth bits of the sample 3 word, for the third and fourth quadrature signals YA and YB, and determines that $Tmin_{YA}$ and $Tmin_{YB}$ maintain their present values of 3t, all respectively.

With either the routine 130 or the routine 160, the value of Tmin for each LED pulse 2A is decremented by one time interval, making the input device 100 insensitive to noise spikes and the like. An output spike signal from the phototransistor 108 will not cause the value Tmin to be greatly decreased. If Tmin could be adjusted by more than one time interval (in an attempt to calculate the appropriate Tmin value during only one LED pulse 2A), then a noise spike signal from the phototransistor 108 could decrement the Tmin value well below the threshold $V_{TH}$, causing all samples to be read thereafter as a digital "0" input signal.

Figure 10:
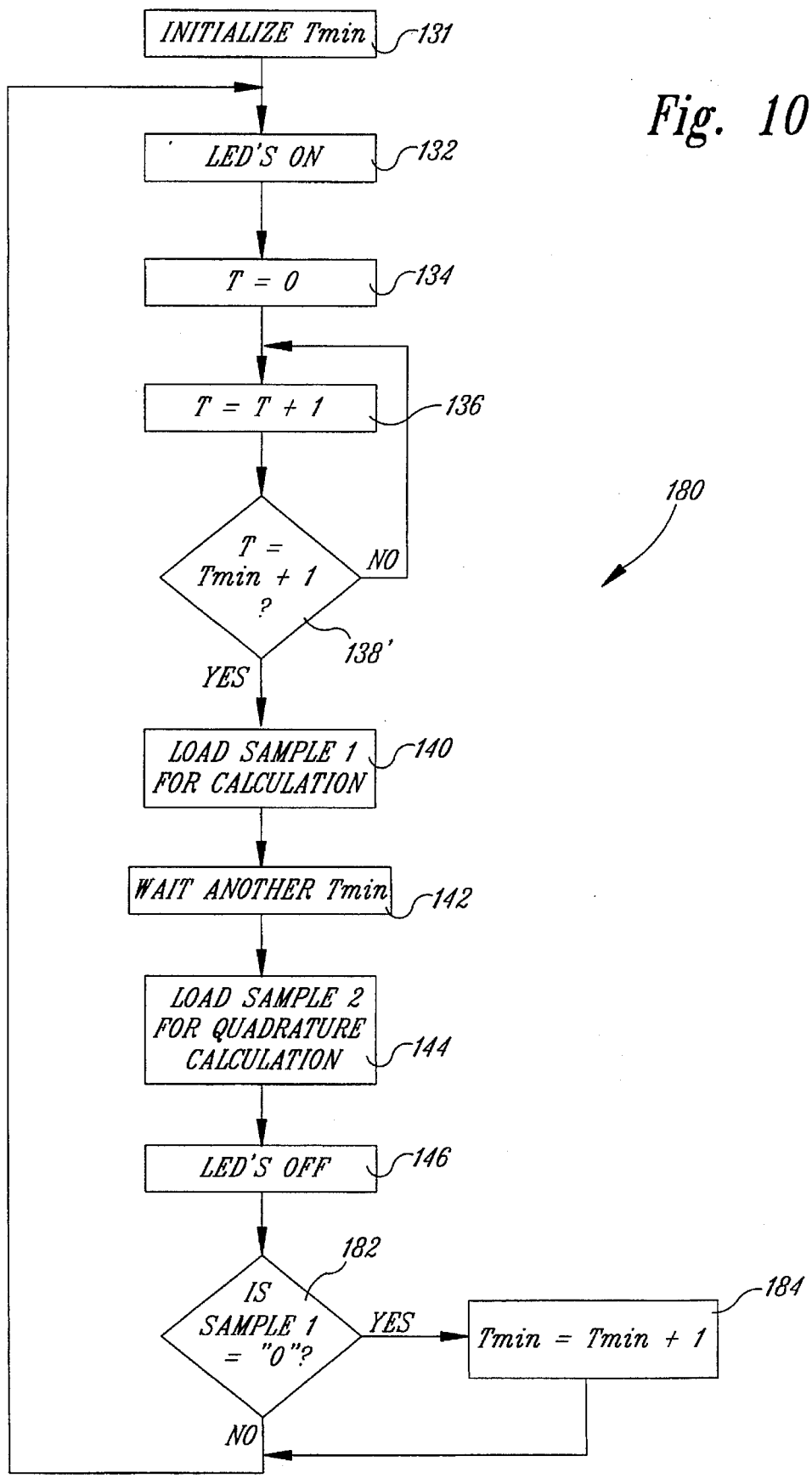
FIG. 10 is a flowchart of part of a second alternative embodiment of instructions executed by the input device of FIG. 1.

To further increase noise immunity, Tmin could be both decremented and incremented over a period of time. In a second alternative embodiment, both the decrementing routine 130 and an incrementing routine 180 (shown in FIG. 10) are stored in the memory 104 and executed by the microprocessor 102. The microprocessor 102 monitors the time elapsed on the clock 103, while the routine 130 is continuously running. After approximately 10 seconds, the routine 130 is halted and the routine 180 is executed. If the value of Tmin is decremented too low under the routine 130 to provide the desired 50% duty cycle, the routine 180 is executed to increment the value of Tmin. The routine 180 begins in the step 131 with the Tmin value determined by the routine 120 (e.g., Tmin equal 3t). The routine 180 generally proceeds through steps 132 through 146 as described above for the routine 130, except that when the counter counts up to time Tmin+t in a step 138' (i.e., 3t), the sample 1 is stored. In step 182, the sample 1 is retrieved from the memory 104 and determined whether it is a digital "0" signal. For the pulse 4A, the phototransistor 108 outputs a signal of approximately 2 volts at time 3t, which is less than the threshold voltage $V_{TH}$. Therefore, the sample 1 is recognized by the microprocessor 102 as a digital "0" signal. Consequently, in step 184, Tmin is incremented by one time interval, resulting in a Tmin value of 4t.

Under this second alternative embodiment, the value of Tmin is capable of being decremented under the routine 130 for multiple light pulses 2A, and then after approximately 10 seconds, Tmin is capable of being incremented under the routine 180. Use of both incrementing and decrementing routines for the value Tmin insures that the value Tmin does not drop too low under the routine 130 whereby all output signals from the phototransistor 108 are recognized by the microprocessor 102 as digital "0" signals. If the value of Tmin drops too low under the routine 130, the routine 180 increments the value of Tmin to achieve the desired 50% duty cycle. If the incrementing routine calculates a Tmin value which is too high to provide the desired 50% duty cycle, the decrementing routine follows quickly thereafter and will decrease the value of Tmin to its appropriate value. As a result, in step 138' of the routine 180, the counter counts up to Tmin (rather than Tmin+t) and loads sample 1 at this time in the second alternative embodiment.

Figure 11:
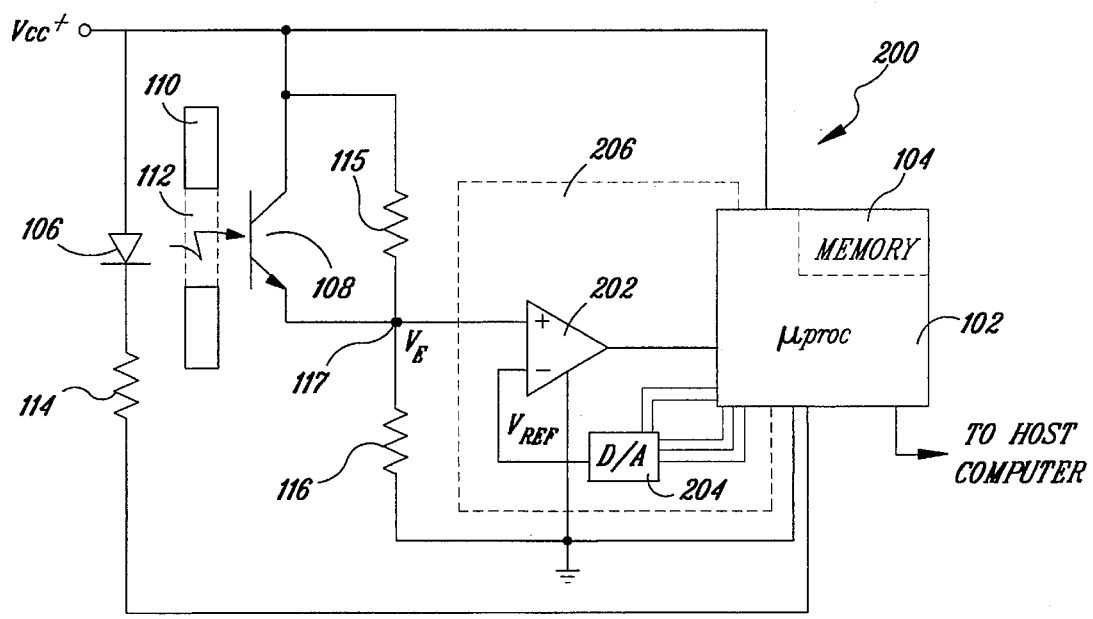
FIG. 11 is a schematic diagram of a third alternative embodiment of the computer input device of the present invention showing a portion of the circuitry of the device.

In a third alternative embodiment, the input device of the present invention, rather than adjusting the time at which samples are taken for quadrature calculation, instead essentially adjusts the threshold voltage $V_{TH}$ of the microprocessor 102 (using a comparator) to compensate for device variations and thus achieves the desired 50% duty cycle. As shown in FIG. 11, a mouse 200 uses a comparator 202, for example, an operational amplifier. The comparator 202 has an input, such as the non-inverting input of the operational amplifier, coupled to the node 117. The comparator's output is coupled to the input of the microprocessor 102. A digital-to-analog converter 204 receives several inputs from the microprocessor 102 and outputs an analog threshold voltage signal $V_{REF}$ to the comparator 202, preferably the non-inverting input of the operational amplifier.

The comparator 202 and the digital-to-analog converter 204 may be monolithically integrated together as a comparator circuit 206. Moreover, the comparator circuit 206 may be monolithically integrated with the microprocessor 102. Microcontrollers, Model Nos. KS57C0002 and KS57C0302, manufactured by Samsung of South Korea, provide such analog comparator 202 and digital-to-analog converter 204 integrated on the same chip as the microprocessor 102, and are preferably used in this embodiment of the present invention. Since the comparator 202 is integrated with the microprocessor 102 on these chips, the threshold voltage $V_{REF}$ for the chip at the terminal 117 is approximately equal to $V_{TH}$. Thus, as viewed from the terminal 117 of the chip, as the microprocessor 102 adjusts the threshold voltage of the comparator $V_{REF}$, the microprocessor 102 may be seen as adjusting its threshold voltage $V_{TH}$ at the terminal 117.

The microprocessor 102 may adjust the threshold voltage $V_{REF}$ in approximately 16 equal amounts between ground (GND) and $V_{CC}$ (typically +5 volts). Sixteen approximately equal increments between ground and +5 volts allow the microprocessor 102 to adjust the threshold voltage $V_{REF}$ in approximately 0.3 volt increments. By adjusting the threshold voltage $V_{REF}$, the microprocessor 102 may compensate for optoelectronic device variations (and its own threshold voltage $V_{TH}$ variations) to provide the desired 50% duty cycle. The adjusted threshold voltage $V_{REF}$ is selected and output from the microprocessor 102, converted to analog by the digital to analog converter 204 and input to the comparator 202. The comparator 202 thus compares the output from the phototransistor 108 to the appropriately adjusted threshold voltage $V_{REF}$.

Figure 12:
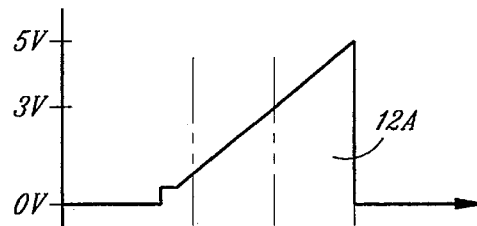
FIG. 12 shows a typical signal output from the photodetector, wherein the photodetector and/or LED has a higher than average gain.
Figure 13:
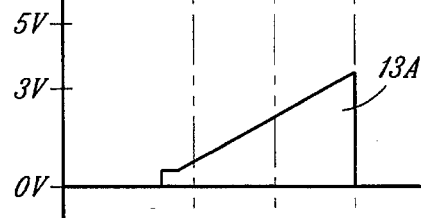
FIG. 13 shows a typical signal output from the photodetector, wherein the photodetector and/or LED has an average gain.
Figure 14:
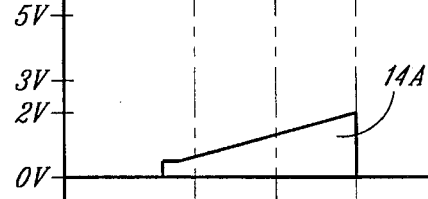
FIG. 14 shows a typical signal output from the photodetector, wherein the photodetector and/or LED has a lower than average gain.
Figure 16:
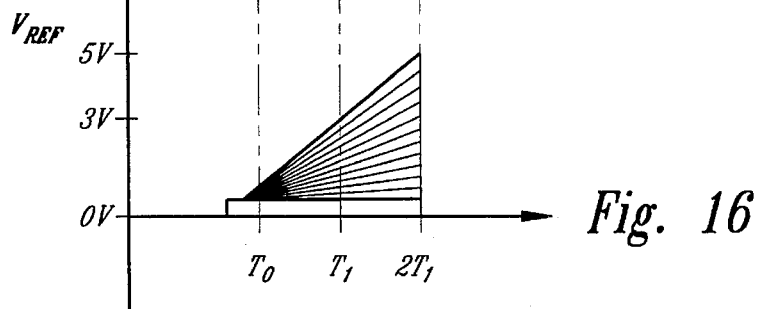
FIG. 16 shows a typical family of pulses input to a comparator of FIG. 11.

FIGS. 12–14 show typical pulses output from the phototransistor 108, when the encoder wheel 110 is fully open, for phototransistor and/or LEDs having higher than average gain, average gain, and lower than average gain, respectively. FIG. 16 shows a family of 16 pulses that will exist in the mouse 200 having the phototransistor 108 and/or LED 106 with a higher than average gain. A routine 210 performed by the microprocessor 102 adjusts the threshold voltage $V_{REF}$ to provide half of the pulses shown in FIG. 16 below the threshold to be recognized by the microprocessor 102 as a digital "0" signal, and the other half above the threshold to be recognized by the microprocessor as a digital "1" signal.

Figure 15:
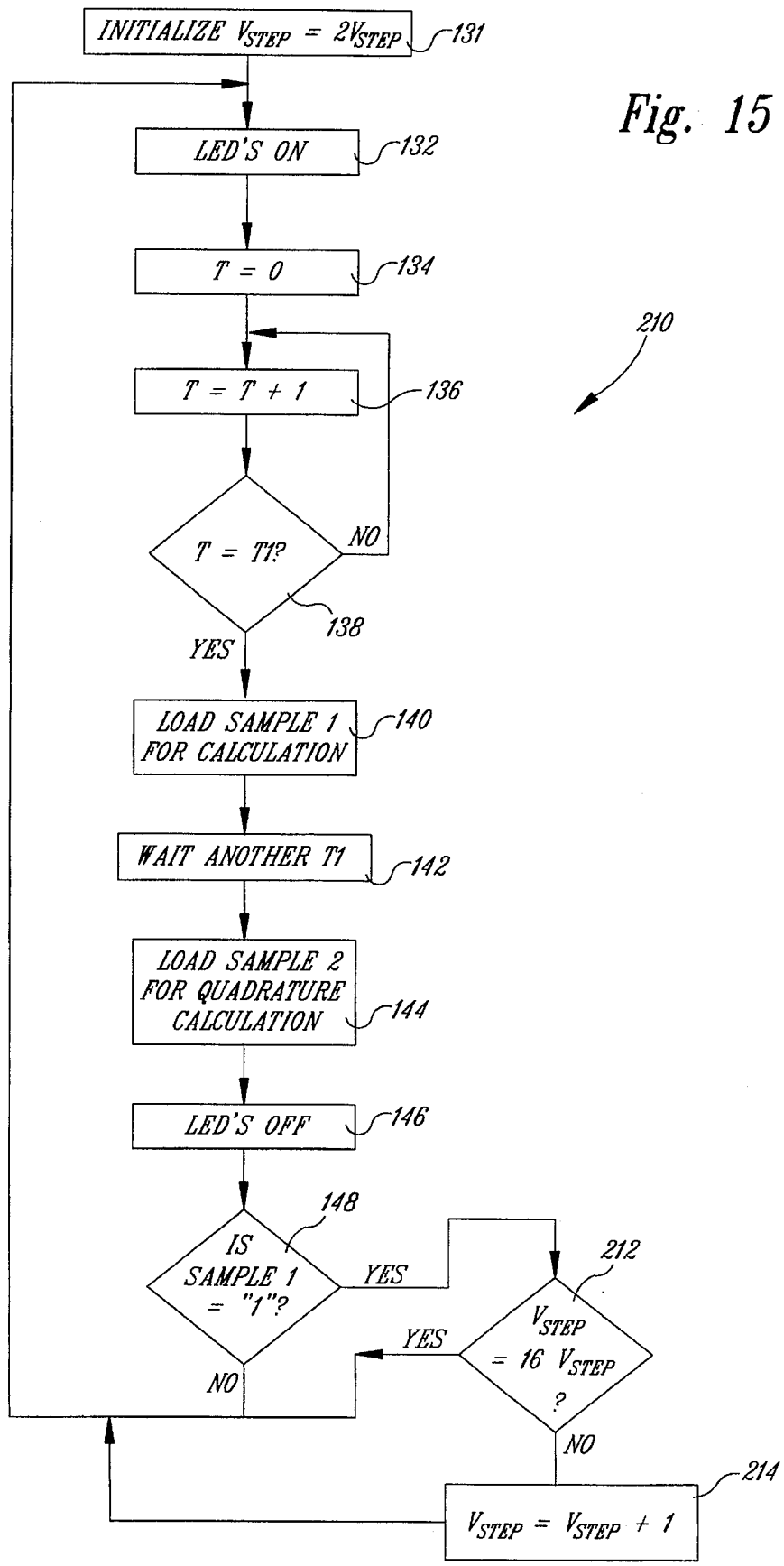
FIG. 15 is a flowchart of a third alternative embodiment of instructions executed by the input device of FIG. 11.

As noted above, the third alterative embodiment adjusts the threshold voltage of the "microprocessor" (actually, of the comparator) rather than the time at which samples are taken. Therefore, as shown in FIG. 15, the routine 210 in the step 131, rather than initializing the time Tmin, initializes a voltage variable $V_{STEP}$. $V_{REF}$ is equal to $nV_{STEP}$ where $V_{STEP}$ is preferably equal to 0.3 volts and n equals 1, 2, 3 . . . . In step 131, the routine 210 initializes the voltage $V_{STEP}$ to equal two times $V_{STEP}$ or $2V_{STEP}$. This initialization of the voltage $V_{STEP}$ is to set this variable at its lowest increment above a voltage $V_E$ at the node 117. The routine 210 continues in much the same way as the routine 130, except that the counter counts up to a time value of T1 in steps 134, 136, and 138. The time value T1 is approximately equal one half the duration of the LED pulse 2A. Therefore, for an LED pulse of 64 microseconds in duration, the value of T1 is preferably 32 microseconds. At time T1, the sample 1 is loaded for calculation in step 140. After another time value T1, or 2T1, the sample 2 is loaded for quadrature calculation in step 144.

In step 148, the microprocessor 102 retrieves the sample 1 from the memory 104 and determines whether it is a digital "1" signal. Since the voltage $V_{STEP}$ is set at only 2 $V_{STEP}$, even for the weakest optoelectronic device outputs, the sample 1 will be above the threshold voltage 2 $V_{STEP}$, and therefore will be recognized as a digital "1" signal. Consequently, in step 212, the microprocessor 102 determines whether the current voltage variable $V_{STEP}$ is equal to its maximum value or 16 $V_{STEP}$. If not, in step 214, the voltage $V_{STEP}$ is incremented by one voltage increment, i.e., by 0.3 volts. The routine 210 continues in several iterations for the next few LED pulses 2A and increments the voltage $V_{STEP}$ until a digital "0" signal is recognized by the microprocessor at the midpoint during the LED pulse on-time (i.e., at time T1).

The currently preferred Samsung microcontroller chip noted above includes a multiplexing circuit, but only one comparator circuit 206. This chip may read only one input voltage at a time (although these voltages may be multiplexed). Therefore, the four quadrature signals XA, XB, YA, and YB may be sampled under one of two implementations: (1) sampled consecutively during consecutive LED pulses at the same time T1 during each pulse, or (2) all sampled during one LED pulse 2A, but at different times T1. In the first implementation (1), if only one quadrature signal XA, XB, YA, or YB is sampled during each LED pulse 2A, the mouse 200 uses four times the normal LED current necessary.

In the second implementation (2), if all four quadrature signals are read in sequence during a given LED pulse, the readings can be 4 microseconds apart, preferably centered around time T1. However, to get different $V_{STEP}$ values for each reading, the time between readings must be longer, due to constraints on the particular Samsung chip. If the sample 1 taken for each quadrature signal deviates too far from the time value T1, the desired 50% duty cycle will not be obtained for each quadrature signal. To compromise, the mouse 200 uses alterative LED pulses 2A for each axis, i.e., the XA and YB, and YA and YB quadrature signals. Each X and Y axes pair of quadrature signals can have different T1 values. However, each pair of quadrature signals would not deviate too far from the time value T1. Additionally, in the preferred embodiment, the phototransistors for each axis are manufactured together in a single photodetector package, and they both receive light from a single LED. Optoelectronic device variations, for the devices outputting the X or Y axes quadrature signals (i.e., XA, XB or YA, YB signals), therefore, will generally not vary significantly.

Under the present invention, the value of Tmin or $V_{TH}$ is adjusted when the encoder wheel 110 is fully open. Experimentation has shown that, under normal mouse operation, the encoder wheel 110 is frequently in the fully open position. Consequently, the present invention adjusts these values quickly enough (in approximately 5 reset), and the desired 50% duty cycle is achieved rapidly enough, so as to be unnoticeable by a user.

The routines of the present invention performed by the microprocessor 102 together with routines (not shown) to calculate quadrature and format counts in an appropriate format (e.g., the 3-byte signal), are all performed within the time between leading edges of sequential light pulses 2A (i.e., during a single period of LED operation). Under the preferred embodiment, the microprocessor 102 performs all of these routines within 200 microseconds. As shown and described herein, the routines of the present invention compare the value of the signal sampled at Tmin or T1 to a digital "0" or "1" signal using a single loop in the routine, and thus require a short period of processing time. While the LED 106 is preferably pulsed for a fixed duration under the present invention, the duration could be decreased in proportion to reductions in Tmin and 2×Tmin (or T1 and 2T1). Appropriate changes in the routines of the present invention must be made to compensate for changes in loop time and other instructions caused by the decreasing LED pulse duration. Additionally, while the routines shown and described herein increment or decrement the value Tmin or $V_{STEP}$ after the sample of the signal from the phototransistor 108 is taken at time 2×Tmin, Tmin or $V_{STEP}$ could be incremented or decremented before the sample at time 2×Tmin or 2T1 is taken. Those skilled in the relevant art using the detailed description provided herein may make these and other modifications to the present invention to accommodate for instruction execution time, microprocessor and mouse architecture, and memory availability in order to permit the microprocessor 102 to execute these routines within 200 microseconds.

The present invention automatically adjusts for variations in microprocessors and optoelectronic devices caused by aging, supply voltage changes, mechanical misalignment between the optoelectronic devices and the encoder wheel 110, and so forth. The present invention maintains a duty cycle of 50%. Importantly, the present invention provides a rapid method of producing input signals to a microprocessor which permits use of a slower, and therefore cheaper, microprocessor. Furthermore, the present invention is particularly insensitive to noise spikes.

Although specific embodiments of the invention have been described for purposes of illustration, various modifications may be made without departing from the spirit and scope of the invention, as is known by those skilled in the relevant art. For example, while the present invention is described above as a routine stored in the memory 104 and executed by the microprocessor 102, the present invention may also be incorporated into an application-specific integrated circuit ("ASIC") within the mouse 100. Such an ASIC can measure Tmin by using a counter or timer having an interrupt capability. While two-dimensional computer input devices are described by way of example herein, the present invention may be readily modified by one skilled in the relevant art, based on the detailed description provided, to be used with three-dimensional input devices. Additionally, while the present invention is described for use in a computer input device, the present invention may be used in any optoencoding device using optoelectronic devices. These and other changes may be made to the invention in light of the detailed description provided herein. Accordingly, the invention is not limited by the disclosure, but instead its scope is to be determined entirely by reference to the following claims.

What is claimed is:

1. A method of providing adjustable input signals for a computer using a computer input device having a memory, at least one light-emitting element and at least one light-detecting element, the method comprising the steps of:

selecting a first value of time Tmin; and determining whether to adjust the first value of time Tmin by performing the steps (a) activating the light-emitting element, causing it to emit light;

(b) selectively receiving the emitted light by the light-detecting element;

(c) producing a signal by the light-detecting element in response to the selectively received light;

(d) after the step (c) of producing the signal by the light-detecting element, repeatedly incrementing or decrementing, by a selected time interval t, a count value, and after each change in the count value, but prior to sampling the signal, comparing the count value to the first value of time Tmin to determine if the count value is substantially equal to the first value of time Tmin;

(e) after the step (d) of determining that the count value is substantially equal to the first value of time Tmin, sampling and storing a first sample of the signal in the memory;

(f) sampling and storing a second sample of the signal in the memory, the second sample being stored at a second value of time after the first value of time Tmin, the second value of time having a relationship to the first value of time Tmin, the second sample being used as an input signal for the computer;

(g) after the step (f) of sampling and storing the second sample of the signal, deactivating the light-emitting element;

(h) retrieving the first sample from the memory;

(i) after the step (g) of deactivating the light-emitting element, comparing the retrieved first sample to a selected value;

(j) after the step(g) of deactivating the light-emitting element and after the step (i) of comparing the retrieved first sample to the selected value, changing the first value of time Tmin by the selected time interval t if the first sample has a predetermined relationship to the selected value; and (k) after the step (j) of changing the first value of time Tmin by the selected time interval t, repeating the steps of (a) through (j) whereby upon repeating the steps (a) through (j), the first value of time Tmin is incrementally changed by only one of the selected time interval t during each repetition of the steps (a) through (j) until the first sample no longer has the predetermined relationship to the selected value.

2. The method of claim 1 wherein the second value of time is substantially equal to twice the first value of time Tmin.

3. The method of claim 1 wherein the selected value is a digital "1" value and the step (j) of changing includes decrementing the first value of time Tmin by one selected time interval t if the first sample is substantially equal to the digital "1" value.

4. The method of claim 3 wherein the step of repeating includes the steps of:

(A) repeating the steps of (a) through (j) for a third value of time; and (B) again performing the steps of (a) through (j), but wherein the selected value is a digital "0" value and the step of changing includes incrementing the first value of time Tmin by one selected time interval t if the first sample is substantially equal to the digital "0" value.

5. The method of claim 4 wherein the step (A) is performed more frequently than the step (B).

6. The method of claim 3 wherein the first value of time Tmin is selected so that the first sample is substantially equal to the digital "1" value.

7. The method of claim 1 wherein the selected value is a digital "0" value and the step (j) of changing includes incrementing the time value by one selected time interval t if the first sample is substantially equal to the digital "0" value.

8. The method of claim 1 wherein the steps of determining whether to adjust the first value of time Tmin are performed in the order of (a), (b), (c), (d), (e), (f), (g), (h), (i), (j) and (k).

9. The method of claim 1 wherein the steps (e) and (f) of sampling and storing include the step of storing a series of samples of the signal during a corresponding series of the selected time intervals t, and wherein the first sample is stored at a first time interval substantially equal to the first value of time Tmin and the second sample is stored at a second time interval substantially equal to the second value of time, whereby the series of samples are stored without looping during activation of the light-emitting element.

10. The method of claim 9 wherein the step (a) of activating the light-emitting element includes causing it to emit light for a selected time period.

11. The method of claim 10 wherein the selected time period is substantially 64 microseconds.

12. The method of claim 10, further comprising the step of adjusting the selected time period in response to changes in the first value of time Tmin.

13. The method of claim 9 wherein the selected value is a digital "1" value and the (j) step of changing includes decrementing the first value of time Tmin by one selected time interval t if the first sample is substantially equal to the digital "1" value.

14. The method of claim 1 wherein the steps of (a) through (j) are performed for a first light-emitting element and a first light-detecting element, and thereafter the steps of (a) through (j) are again performed for a second light-emitting element and a second light-detecting element, before the step of (k) is performed.

15. The method of claim 1 wherein the selected time interval t is substantially 4 microseconds.

16. The method of claim 1 wherein the step (a) of activating the light-emitting element includes causing it to emit light for a selected time period, and wherein the first value of time Tmin is substantially equal to one-half the selected time period.

17. A computer input device comprising:

a light-emitting element adapted to emit pulses of light for a selected time period;

a light-detecting element positioned to receive light from the light-emitting element and produce a signal indicating an amount of light received;

an encoder wheel positioned between the light-emitting element and the light-detecting element, the encoder wheel selectively permitting the pulses of light from the light-emitting element to be received by the light-detecting element;

a memory circuit; and a controller circuit electrically coupled to the memory circuit, the light-emitting element and the light-detecting element, the controller circuit (a) storing a first sample of the signal in the memory circuit at a first value of time after the beginning of the selected time period, (b) storing a second sample of the signal in the memory circuit after storing the first sample and at a second value of time related to the first value of time, (c) deactivating the light-emitting element after storing the second sample, (d) comparing the first sample to a first selected value, and (e) after deactivating the light-emitting element, changing the first value of time by only one of a selected time interval if the first sample has a predetermined relationship to the first selected value to thereby incrementally change the first value of time during each deactivation of the light-emitting element.

18. The computer input device of claim 17 wherein the controller circuit is adapted to count increments of the selected time intervals during each pulse of light.

19. A method of obtaining signals for processing by a microprocessor from an optoelectronic device pair, the optoelectronic device pair comprising at least one light-emitting element and one light-detecting element, the microprocessor being coupled to a memory, the method comprising the steps of:

selecting a first value of time;

activating the light-emitting element, causing it to emit light;

selectively receiving the emitted light by the light-detecting element;

producing a signal by the light-detecting element in response to the selectively received light;

sampling and storing a first sample of the signal in the memory, the first sample being stored at the first value of time after activating the light-emitting element;

after storing the first sample, sampling and storing a second sample of the signal in the memory, the second sample of the signal being stored at a second value of time, the second value of time being related to the first value of time, the second sample being obtained for processing by the microprocessor;

deactivating the light-emitting element;

retrieving the first sample from the memory;

comparing the retrieved first sample to a selected value; and after deactivating the light-emitting element, changing the first value of time if the first sample has a predetermined relationship to the selected value.

20. A method of providing input signals for an electrical component from optoelectronic device pairs having at least one light-emitting element and light-detecting element, the electrical component having a memory, the method comprising the steps of:

selecting a first value of time; and determining whether to adjust the first value of time by performing the steps of:

(a) activating the light-emitting element, causing it to emit light;

(b) selectively receiving the light by the light-detecting element;

(c) producing a signal by the light-detecting element in response to the selectively received light;

(d) sampling and storing a first sample of the signal in the memory, the first sample being stored at the first value of time after activating the light-emitting element;

(e) after the step (d) of storing the first sample, sampling and storing a second sample of the signal in the memory for processing by the electrical component, the second sample being stored at a second value of time different from the first value of time, the second value of time having a relationship to the first value of time;

(f) deactivating the light-emitting element;

(g) retrieving the first sample from the memory;

(h) after the step (f) of deactivating the light-emitting element, changing the retrieved first value of time by a selected time interval if the sample has a predetermined relationship to the selected value; and (i) after the step (h) of changing the first value of time by the selected time interval, repeating the steps of (a) through (h) whereby upon repeating the steps (a) through (h), the first value of time is changed by only one of the selected time interval during each repetition of the steps (a) through (h) until the first sample no longer has the predetermined relationship to the selected value.

21. A method of providing input signals for a computer input device having at least one light-emitting element and at least one-detecting element, the method comprising the steps of:

selecting a voltage value;

activating the light-emitting element, causing it to emit light;

selectively receiving the light by the light-detecting element;

producing a signal by the light-detecting element in response to the selectively received light;

providing the signal to the computer input device;

sampling and storing first and second samples of the signal, the first sample being stored at a first value of time after activating the light-emitting element, and the second sample being stored at a second value of time, the second value of time having a relationship to the first value of time, the second sample being used as an input signal by the computer input device;

deactivating the light-emitting element;

retrieving the first sample;

after the step of deactivating the light-emitting element, comparing the first sample to a selected value; and changing the voltage value by at least one of a selected voltage amount if the first sample has a predetermined relationship to the selected value.

22. The method of claim 21 wherein the second value of time is substantially equal to twice the first value of time, wherein the selected value is a digital "1" value, and wherein the step of changing includes incrementing the voltage value by one selected voltage amount if the first sample is substantially equal to the digital "1" value.

23. The method of claim 22 wherein the step of changing includes determining if the voltage value is substantially equal to a maximum voltage value, and if not, then incrementing the voltage value by one selected voltage amount.

24. The method of claim 23 wherein the voltage value is selected to ensure that the first sample is substantially equal to the digital "1" value.

25. The method of claim 23 wherein the voltage value is changed by at most one of a selected voltage amount.

26. In a routine for providing input signals from an electrical component having a memory and an optoelectronic device pair, the optoelectronic device pair having at least one light-emitting element and light-detecting element, the routine including the steps of (i) activating the light-emitting element and causing it to emit light, (ii) selectively receiving the emitted light by the light-detecting element, (iii) producing a signal by the light-detecting element in response to the selectively received light, and (iv) deactivating the light-emitting element, a method of adjusting a time at which samples of the signal are provided as the input signals by adjusting a time value Tmin, the method comprising the steps of:

selecting a first value of time Tmin;

incrementing or decrementing, at a selected time interval t, a count value;

comparing the count value to the first value of time Tmin to determine if the count is approximately equal to the first value of time Tmin; and determining whether to adjust the first value of time Tmin by performing the steps (a) after determining that the count value is approximately equal to the first value of time Tmin, sampling and storing a first sample of the signal in the memory, the first sample being stored at the first value of time Tmin after activating the light-emitting element;

(b) sampling and storing a second sample of the signal in the memory for processing by the electrical component, the second sample being stored at a second value of time different from the first value of time Tmin, the second value of time having a relationship to the first value of time Tmin;

(c) retrieving the first sample from the memory;

(d) after the step (iv) of deactivating the light-emitting element, changing the first value of time Tmin by one of a selected time interval t if the sample has a predetermined relationship to the selected value; and (e) after the step (d) of changing the first value of time Tmin by one selected time interval t, repeating the steps of (a) through (d) whereby upon repeating the steps (a) through (d), the first value of time Tmin is changed by only one of the selected time interval t during each repetition of the steps (a) through (d) until the first sample no longer has the predetermined relationship to the selected value.

27. In a routine for providing input signals from an electrical component having a memory and an optoelectronic device pair, the optoelectronic device pair having at least one light-emitting element and light-detecting element, the routine including the steps of (i) activating the light-emitting element and causing it to emit light, (ii) selectively receiving the emitted light by the light-detecting element, (iii) producing a signal by the light-detecting element in response to the selectively received light, and (iv) deactivating the light-emitting element, a method of adjusting a time at which samples of the signal are provided as the input signals by adjusting a time value Tmin, the method comprising the steps of:

selecting a first value of time Tmin; and determining whether to adjust the first value of time Tmin by performing the steps of (a) sampling and storing a series of samples of the signal in the memory for processing by the electrical component during a corresponding series of selected time intervals t, wherein a first sample in the series of stored samples is stored at a first time interval approximately equal to the first value of time Tmin, and wherein a second sample in the series of stored samples is stored at a second time interval approximately equal to a second value of time, the second value of time having a relationship to the first value of time Tmin, the second sample being used as an input signal for the computer;

(b) retrieving the first sample in the series of stored samples from the memory;

(c) after the step (iv) of deactivating the light-emitting element, changing the first value of time Tmin by one of a selected time interval t if the sample has a predetermined relationship to the selected value; and (d) after the step (c) of changing the first value of time Tmin by one of the selected time interval t, repeating the steps of (a) through (c) whereby upon repeating the steps (a) through (c), the first value of time Tmin is changed by only one of the selected time interval t during each repetition of the steps (a) through (c) until the first sample no longer has the predetermined relationship to the selected value.

28. The method of claim 27 wherein the step (a) of sampling and storing the series of samples includes storing a first series of consecutive samples of the signal during a first series of the selected time intervals t substantially equal to the first value of time Tmin, and a second series of alternating samples of the signal thereafter.

29. The method of claim 28 wherein the second value of time is substantially equal to twice the first value of time Tmin.

30. The method of claim 27 wherein the step (iii) of producing includes producing first, second, third and fourth signals by first, second, third and fourth light-detecting elements, respectively, and wherein the step (a) of sampling and storing includes storing a portion of the first, second, third and fourth signals substantially concurrently, during the selected time intervals t.

31. The method of claim 30 wherein the step (c) of changing includes the step of comparing the selected value to each portion of the first, second, third and fourth signals stored at the first time interval Tmin.

* * * * *

UNITED STATES PATENT AND TRADEMARK OFFICE
CERTIFICATE OF CORRECTION

PATENT NO.    : 5,557,440
DATED         : September 17, 1996
INVENTOR(S)   : Mark T. Hanson et al.

It is certified that error appears in the above identified patent and that said Letters Patent is hereby corrected as shown below:

In column 20, claim 1, line 47, following "steps" please insert --of:--.

In column 24, claim 25, line 32, please delete "23" and insert therefor --21--.

In column 24, claim 26, line 55, following "steps" please insert --of:--.

In column 25, claim 27, line 29, following "of" please insert --:--.

Signed and Sealed this

Fourteenth Day of January, 1997

Attest:

BRUCE LEHMAN

Attesting Officer        Commissioner of Patents and Trademarks